United States Patent
Terazono et al.

(10) Patent No.: US 7,676,104 B2
(45) Date of Patent: Mar. 9, 2010

(54) OUTLINE FONT COMPRESSION METHOD

(75) Inventors: Kohei Terazono, Kawasaki (JP); Yoshiyuki Okada, Kawasaki (JP); Satoshi Iwata, Kawasaki (JP); Masashi Takechi, Osaka (JP)

(73) Assignees: Fujitsu Limited, Kawasaki (JP); Morisawa & Company Ltd., Osaka (JP)

(*) Notice: Subject to any disclaimer, the term of this patent is extended or adjusted under 35 U.S.C. 154(b) by 1029 days.

(21) Appl. No.: 11/275,609

(22) Filed: Jan. 19, 2006

(65) Prior Publication Data

US 2007/0070071 A1 Mar. 29, 2007

(30) Foreign Application Priority Data

Sep. 29, 2005 (JP) ............................. 2005-285457

(51) Int. Cl.
*G06K 9/48* (2006.01)
(52) U.S. Cl. .................. 382/242; 382/232; 382/238; 382/243
(58) Field of Classification Search ................ 382/232, 382/239, 242, 243; 341/50, 51, 106; 345/469, 345/472, 467, 468; 358/1.11, 1.15; 396/551; 347/232
See application file for complete search history.

(56) References Cited

U.S. PATENT DOCUMENTS 5,646,617 A 7/1997 Ohmoto et al. ............. 341/ 51
5,734,388 A * 3/1998 Ristow et al. ............... 345/472
5,754,187 A * 5/1998 Ristow et al. ............... 345/469
6,384,745 B1 5/2002 Azam et al. .................. 341/50

FOREIGN PATENT DOCUMENTS

| JP | 5-80741 | 4/1993 |
| JP | A-H05-080741 | 4/1993 |
| JP | 5-127648 | 5/1993 |
| JP | A-H05-127648 | 5/1993 |
| JP | 6-149215 | 5/1994 |
| JP | A-H06-149215 | 5/1994 |
| JP | 7-73306 | 3/1995 |
| JP | A-H07-073306 | 3/1995 |
| JP | 10-222145 | 8/1998 |
| JP | A-H10-222146 | 8/1998 |
| JP | 11-242472 | 9/1999 |
| JP | 2001-44850 | 2/2001 |

(Continued)

OTHER PUBLICATIONS

Korean Office Action, dated Apr. 19, 2007, and issued in corresponding Korean Patent Application No. 10-2006-0009347.

*Primary Examiner*—Anh Hong Do

(57) ABSTRACT

A Bezier curve constituting outline font data represents a curve by four coordinate values of a start point, an end point, and two control points. The curve is represented by two coordinates of the start point and the end point in collinear approximation, and by three coordinates of the start point, an intersecting point of two lines, and the end point in bi-linear approximation. In curve pattern approximation, when 32 curve patterns are prepared, the curve is represented by 5-bit data of two coordinates of the start point and the end point, and a pattern number. By effectively employing these three kinds of processes, it is possible to represent a Bezier curve constituting the outline font data with a reduced data volume.

7 Claims, 12 Drawing Sheets

FOREIGN PATENT DOCUMENTS

| | | |
|---|---|---|
| JP | A-2001-044850 | 2/2001 |
| JP | 2001-109454 | 4/2001 |
| JP | A-2001-109454 | 4/2001 |
| JP | 2004-516496 | 6/2004 |
| JP | A-2004-516496 | 6/2004 |

* cited by examiner

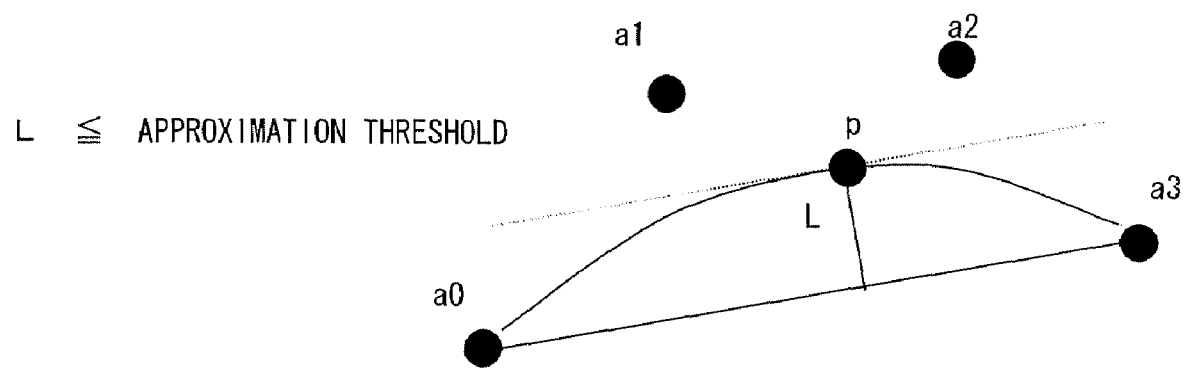
F I G. 3

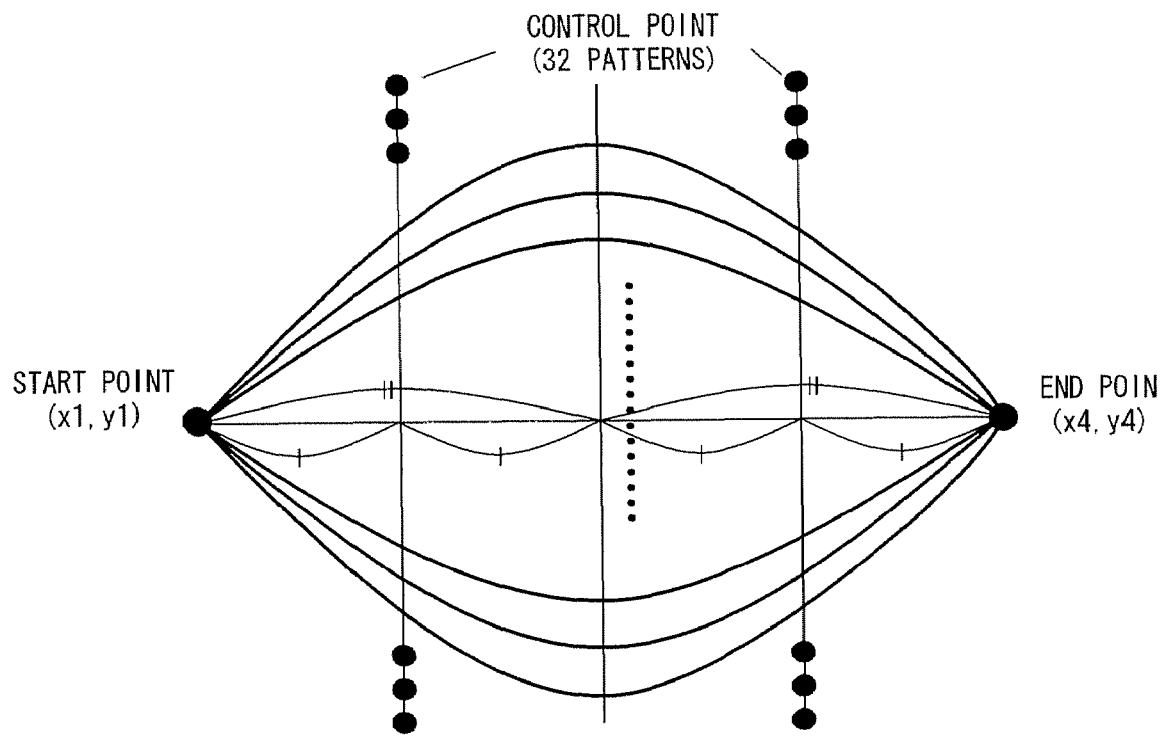
F I G. 6

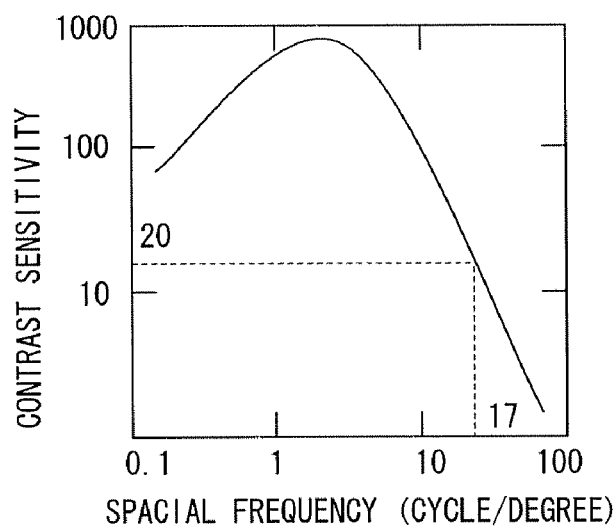 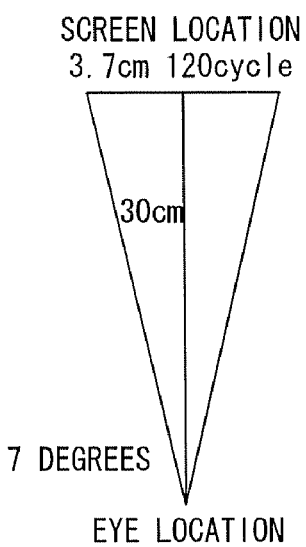
FIG. 7

| PATTERN NUMBER q | EQUATION REPRESENTING BEZIER CURVE |
|---|---|
| 0 | $x = (1-s)^3 x_1 + 3(1-s)^2 s(3x_1 + x_4)/4 + 3(1-s)s^2(x_1+3x_4)/4 + s^3 x_4$<br>$y = (1-s)^3 y_1 + 3(1-s)^2 s \times 16 \times 5 + 3(1-s)s^2 \times 16 \times 5 + s^3 y_4$<br>$(0 \leq s \leq 1)$ |
| 1 | $x = (1-s)^3 x_1 + 3(1-s)^2 s(3x_1 + x_4)/4 + 3(1-s)s^2(x_1+3x_4)/4 + s^3 x_4$<br>$y = (1-s)^3 y_1 + 3(1-s)^2 s \times 15 \times 5 + 3(1-s)s^2 \times 15 \times 5 + s^3 y_4$<br>$(0 \leq s \leq 1)$ |
| 2 | $x = (1-s)^3 x_1 + 3(1-s)^2 s(3x_1 + x_4)/4 + 3(1-s)s^2(x_1+3x_4)/4 + s^3 x_4$<br>$y = (1-s)^3 y_1 + 3(1-s)^2 s \times 14 \times 5 + 3(1-s)s^2 \times 14 \times 5 + s^3 y_4$<br>$(0 \leq s \leq 1)$ |
| ⋮ | ⋮ |
| 30 | $x = (1-s)^3 x_1 + 3(1-s)^2 s(3x_1 + x_4)/4 + 3(1-s)s^2(x_1+3x_4)/4 + s^3 x_4$<br>$y = (1-s)^3 y_1 + 3(1-s)^2 s \times (-14) \times 5 + 3(1-s)s^2 \times (-14) \times 5 + s^3 y_4$<br>$(0 \leq s \leq 1)$ |
| 31 | $x = (1-s)^3 x_1 + 3(1-s)^2 s(3x_1 + x_4)/4 + 3(1-s)s^2(x_1+3x_4)/4 + s^3 x_4$<br>$y = (1-s)^3 y_1 + 3(1-s)^2 s \times (-15) \times 5 + 3(1-s)s^2 \times (-15) \times 5 + s^3 y_4$<br>$(0 \leq s \leq 1)$ |

FIG. 8

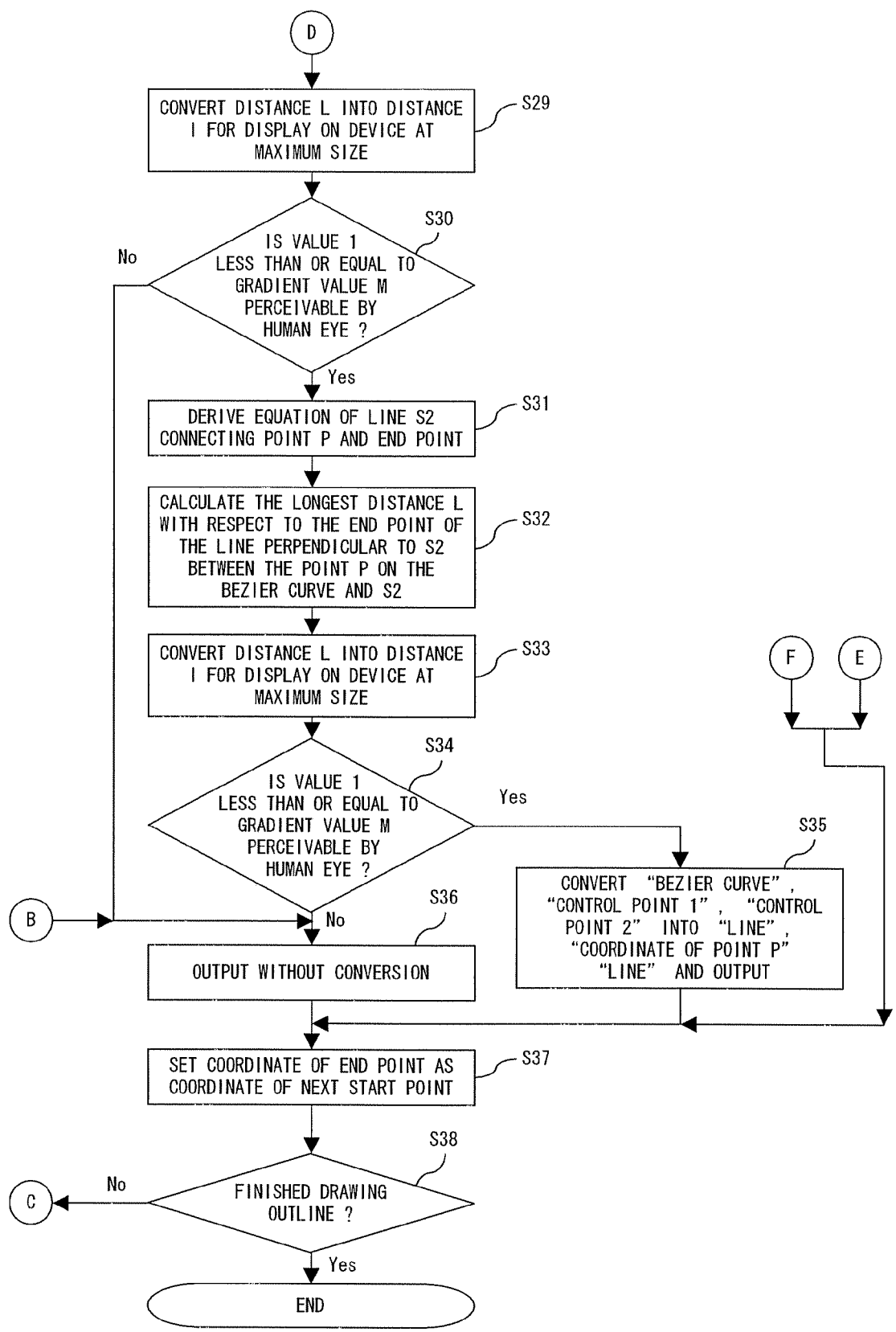
F I G. 1 0 C

OUTLINE FONT COMPRESSION METHOD

BACKGROUND OF THE INVENTION

1. Field of the Invention

When displaying characters on an apparatus with a display device such as LCD (Liquid Crystal Display), characters can be displayed with high quality and at any size from a piece of data by employing an outline font.

Conventionally, the outline font is mainly of use in a computer with a high computing capacity as it requires calculation of outlines and calculation for filling inside the outline; however, the outline font has recently been used in embedded devices such as the cellular phone owing to the improvement of processing capacity.

Nonetheless, the size of stored data needs to be small so that the memory deployed in an embedded device which has a small capacity in many cases, may implement as many functions as possible with this small amount of memory.

The object of the present invention is to reduce the size of the conventional outline font data in view of the fact that the display device incorporated in an embedded device has an upper limit on the required character size.

The outline font data generated by the present invention can be incorporated into various character display devices, and therefore it has a wide range of usage. The present invention in particular has a high compression ratio regarding the font of a curve-laden typeface, which has been difficult to apply compression to for it has large data size, and therefore, the present invention has a great deal of utility value.

2. Description of the Related Art

Conventionally, there has been a method for performing an entropy compression of a coordinate value and a relative value of an adjacent coordinate using Huffman coding (see Patent Document 1), and a lossless compression method for performing compression after encoding the continuity of codes representing lines and curves lined up in the stroke order of an outline (see Patent Document 2) as a method for reducing the size of the outline font.

On the other hand, as a size reduction method using approximation, like the present invention, there is, for example, a method known for reducing a number of required bits representing each coordinate by representing an outline data design of 10000×10000 pixels with its resolution reduced to a level (for example 256×256 pixels), which does not cause deterioration of the design, resulting in a reduced data size, and for assigning an appropriate equation of a line/curve of the reduced size (see Patent Document 3). In this method, a line from the coordinate (3000, 5000) to the coordinate (3025, 4990) at 10,000×10,000 pixels is a line with a length of 0 from the coordinate (77, 128) to the coordinate (77, 128) at 256×256 pixels resolution. Therefore the line can be omitted, and can be reduced in data size.

The above lossless compression method has a problem that large-sized original data still has a large size after compression for it has a limited compression ratio.

As another method for reducing resolution, if a display device is capable of displaying 256 gradients, deviation from the original design can be compensated for by an anti-aliasing technique. However, on the actual device, even in a case that a character of 40×40 pixels or more does not need to be drawn (for example, a screen display in a part of an embedded device) when the resolution of the outline data is reduced to 40×40 pixels, the anti-aliasing technique is not sufficient for compensating for the deviation from the original design, resulting in failure to achieve the intended display. Therefore, like the above lossless compression method, there is a limit to the compression ratio.

FIG. 1 is a diagram showing a conventionally known data description method of a general outline font. In general, outline font data comprises a header describing data properties etc. (not shown in the drawings) and a part describing the outline of each character as shown in FIG. 1. In FIG. 1, as data describing a character outline, coordinates and types of lines connecting each coordinate are described in order starting from one point on a closed curve.

Patent Document 1: Laid-open Japanese Patent Application No. H06-149215

Patent Document 2: Laid-open Japanese Patent Application No. 2001-044850

Patent Document 3: Laid-open Japanese Patent Application No. 2004-516496

SUMMARY OF THE INVENTION

In order to address the above problem, it is an object of the present invention to provide an outline font compression method for reducing the size of outline font data by performing approximation of a part of a Bezier curve constituting the outline font data at a level such that the difference in designs cannot be perceived by human beings.

In order to address the above problem, the present invention comprises any one or more of a first approximation process for approximating the data when a distance between a curve and a line is a value L or less, by a line among data representing a Bezier curve comprised as outline data, when the outline data of the character is designed to an accuracy of a size X square is present, and a size of the character to be displayed on a screen is a size Y (Y<X) or less, a second approximation process for approximating a Bezier curve, where a distance between a curve and a line is L or more in the first approximation process, and the distance is L' (L'>L) or less by two lines, and a third approximation process for, when the degree of curvature of the Bezier curve is close to a predefined curve pattern, approximating the Bezier curve by the pattern.

The present invention has an advantage that, even when there is a limit in compressibility in the conventional compression method, and if the upper limit of the character size output to a display device is determined, the outline font data size can be reduced by approximation of a part of a Bezier curve constituting outline font data at a level such that a human being cannot perceive the difference in designs, and therefore, a high compression effectiveness can be obtained, especially for a font design with many curves in its outlines.

BRIEF DESCRIPTION OF THE DRAWINGS

FIG. 3 is a diagram for explaining the collinear approximation of a Bezier curve;

FIG. 6 is a diagram describing an example of the approximate curve pattern as a Bezier curve;

FIG. 7 are diagrams for explaining the approximation threshold, (a) is a diagram showing the correspondence between the spatial frequency and the contrast sensitivity and (b) is for explaining the method of obtaining the spatial frequency of an LCD of a cellular phone;

FIG. 8 is an example of a table indicating the correspondence between the pattern number and pattern Bezier curves;

FIG. 10C is a flowchart explaining a conversion processing operation relating to the embodiment of the present invention.

DESCRIPTION OF THE PREFERRED EMBODIMENT

In the following description, the embodiments of the present invention are explained with reference to the drawings.

Figure 2:
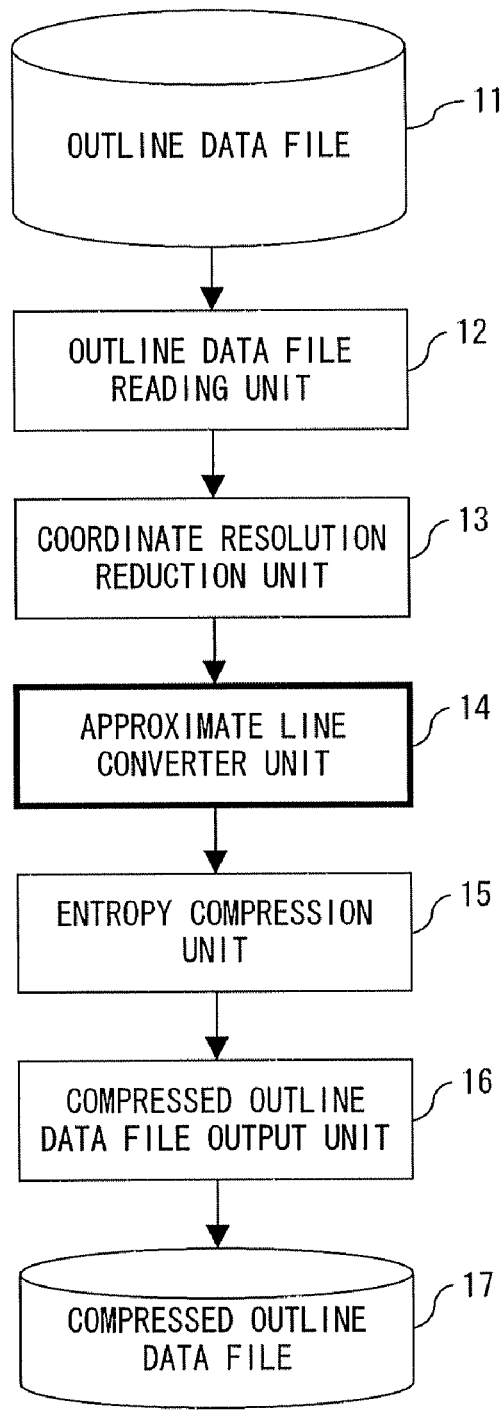
FIG. 2 is a block diagram showing a configuration of the outline font compression method relating to the present invention.

FIG. 2 is a block diagram showing a configuration of the outline font compression method relating to the present invention. The outline font compression method relating to the embodiments of the present invention of FIG. 2, for example, comprises an outline font data file 11 for storing outline font data of a 256×256 pixel design, an outline data file reading unit 12 for reading the outline font data of 256×256 pixels for example, from the outline data file 11, a coordinate resolution reduction unit 13 for performing reducing processing of the coordinate resolution to the read out 256×256 pixel outline font data for example, an approximate line converter unit 14 for converting a part of curve data of the outline font data processed to lower the coordinate resolution into line data, an entropy compression unit 15 for applying entropy compression to all of the outline font data for which the approximate line conversion is complete, a compressed outline data file output unit 16 for outputting the compressed outline data for which the entropy compression is complete to files, and a compressed outline data file 17 for storing the output compressed outline data. In the above configuration, configurations other than that of the approximate line converter unit 14 for converting a part of curve data into line data by approximation are practically applied to the above lossless compression method and a method for lowering the resolution.

In the present embodiment, a common outline font description method for describing coordinate values and the types of lines connecting the coordinates as data describing the character outline by arranging in order from a point in a closed curve is employed. In the present embodiment, it is assumed that the original outline data is a design of 256×256 pixel size, and the display device can only draw a maximum size of 40×40 pixels.

Figure 1:
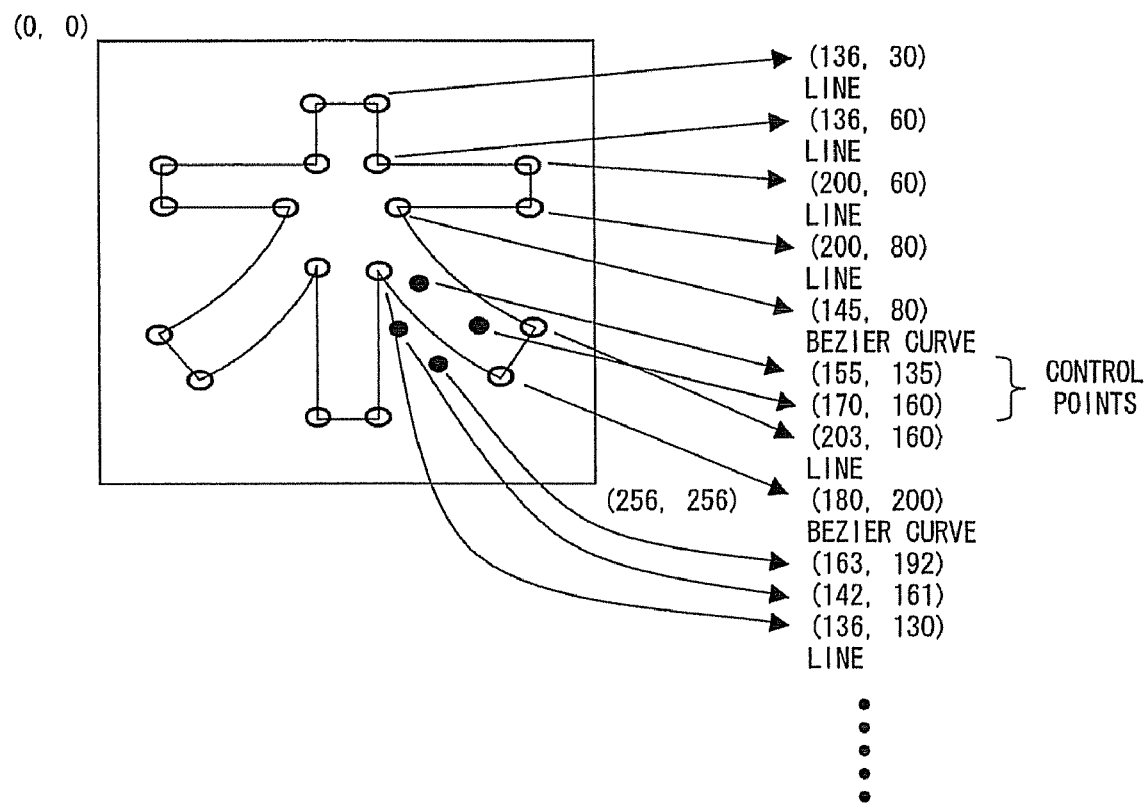
FIG. 1 is a diagram showing a conventionally known data description method of a general outline font.

On the basis of the assumption above, the processing shown in FIG. 2 is performed in sequence, and, the processing for converting a part of curve data into line data by approximation is performed on the outline font data, which is processed to reduce the coordinate resolution by the coordinate resolution reduction unit 13, followed by the approximate line converter unit 14. The data conversion in the approximate line converter unit 14 is performed by processing of, first, discovering a part, which is a Bezier curve in the character outline data of a character shown in FIG. 1 for example, determining whether approximation is possible or not, and if it is converted by approximation, replacing the part of the Bezier curve to be approximated with the data after approximation and outputting the data. The present invention includes collinear approximation, bi-linear approximation, and curve pattern approximation of the Bezier curve in this conversion processing.

FIG. 3 is a diagram for explaining the collinear approximation of a Bezier curve. In FIG. 3, the Bezier curve constituting a part of an outline of the outline font is represented by four points of a0, a1, a2, and a3, where a1 is the start point and a3 is the end point, and a1 and a2 are control points. When attempting approximation of the Bezier curve by a line from a0 to a3, if a distance L produced between the Bezier curve and a point p on the Bezier curve, which is the most distant from the line a0-a3 is the "approximation threshold (explained later)" or less, the Bezier curve is approximated by a single line of a0-a3. By so doing, [Bezier curve]+[a0 x-coordinate value]+[a0 y-coordinate value]+[a1 x-coordinate value]+[a1 y-coordinate value]+[a2 x-coordinate value]+[a2 y-coordinate value]+[a3 x-coordinate value]+[a3 y-coordinate value], which represents the Bezier curve (see FIG. 1) is replaced by [line]+[a0 x-coordinate value]+[a0 y-coordinate value]+[a3 x-coordinate value]+[a3 y-coordinate value] and is output from the approximate line converter unit 14. This enables reduction of the size of the outline font data.

Figure 4:
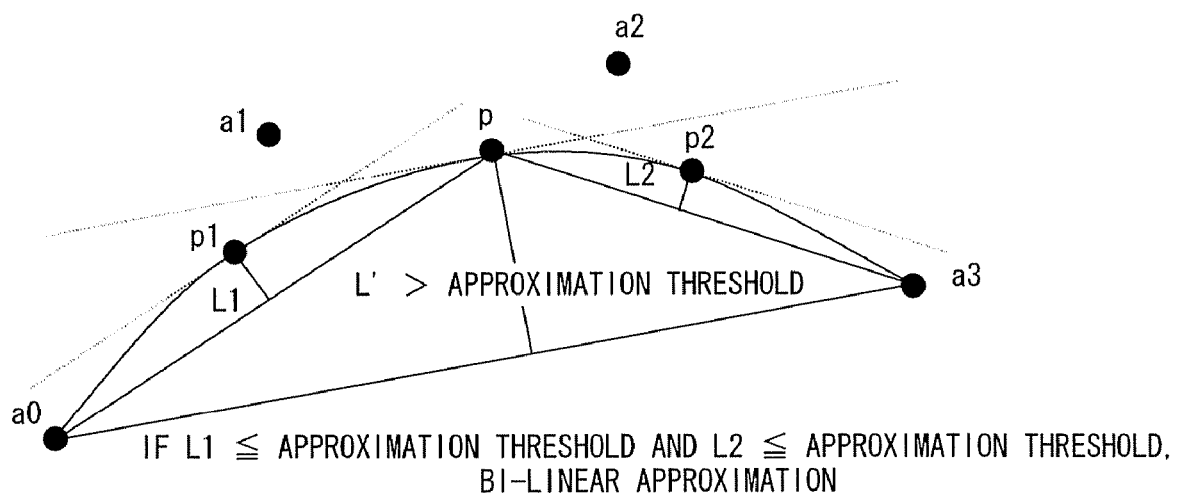
FIG. 4 is a diagram for explaining the bi-linear approximation method of the Bezier curve.

FIG. 4 is a diagram for explaining the bi-linear approximation method of a Bezier curve. In FIG. 4 when the collinear approximation of the Bezier curve described in FIG. 3 cannot be performed, the size of the outline font data can also be reduced as in the case of FIG. 3 by separating the Bezier curve into a Bezier curve from a0 to p and a Bezier curve from p to a3, representing the Bezier curve by two lines a0-p and p-a3 when each of the Bezier curves satisfies the approximation conditions described in FIG. 3, and outputting these as a bi-linear approximation of the Bezier curve from the approximate line converter unit 14. It is noted that a compression effect cannot be obtained from linear approximation after further division of the Bezier curve, and therefore, further division of the Bezier curve is not performed.

Figure 5:
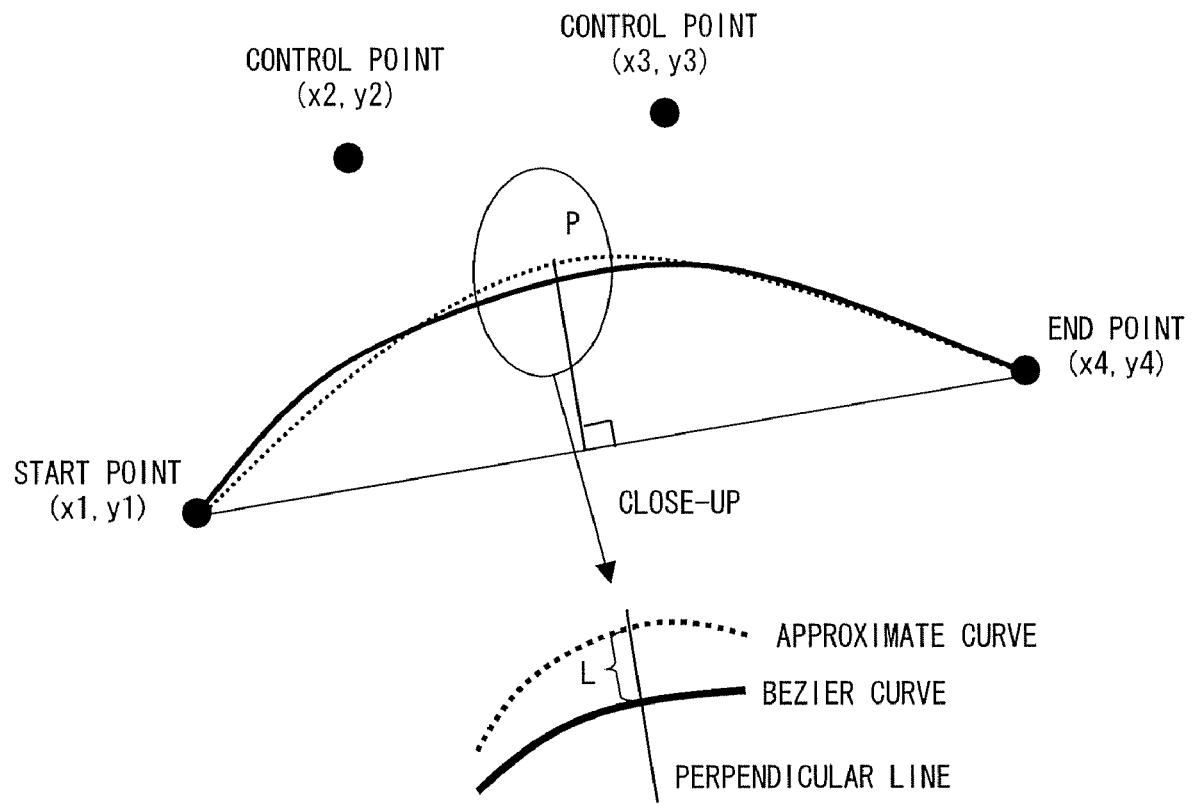
FIG. 5 is a diagram for explaining a curve pattern approximation method of the Bezier curve.

FIG. 5 is a diagram for explaining a curve pattern approximation method of the Bezier curve. In FIG. 5, when attempting approximation of a Bezier curve consisting of a part of the outline of the outline font by a predefined pattern curve (explained later), the distance L, which is a distance between the pattern curve and a point p on the Bezier curve which is the most distant in a perpendicular direction with respect to a line with a start point $(x_1, y_1)$ and an end point $(x_4, y_4)$, is compared with the "approximation threshold (explained later)". If the distance L shown in FIG. 5 is the "approximation threshold (explained later)" or less, this Bezier curve is approximated by the predefined pattern curve. In the approximation by a pattern curve, two coordinates of the start point and end point, and a pattern number are represented by 5-bit data. By so doing, the size of the outline font data can be reduced by the curve pattern approximation method of the Bezier curve.

FIG. 6 is a diagram describing an example of the approximated curve pattern as a Bezier curve. When the pattern curve is considered as a Bezier curve, as shown in FIG. 6, 32 patterns are defined by fixing x-coordinates of control points at the two positions of ¼ and ¾ along the length of a line connecting the start point $(x_1, y_1)$ and the end point $(x_4, y_4)$, and varying y-coordinates from −16 to 15. The defined 32 patterns correspond to pattern numbers, stored in a table (see FIG. 8) for use. It is noted that in approximating a Bezier curve with the start point $(x_1, y_1)$, the end point $(x_4, y_4)$ and the control points $(x_2, y_2)$ and $(x_3, y_3)$ by a pattern Bezier curve, scaling or rotation of the curve is performed, so that the start point and the end point of the pattern curve are the same as those of the Bezier curve, and the curve is compared with each of the 32 patterns stored in the table.

FIGS. 7 (a), and (b) are diagrams for explaining the above approximation threshold. In a case that the outline font data design of 256×256 pixels is displayed at a size of 40×40 pixels, a method for smoothing the outline by representing pixels of which an outline passes through the middle of a gradient value is a well-known method of anti-aliasing. For example, in a case of a region where the upper half of the outline passing through the middle of a pixel of 40×40 pixels is filled, the gradient value of this pixel is 128 of 256 gradients. However, when a person looks at a pixel corresponding to the outline of a character drawn on the LCD of a cellular phone, the person would not feel discomfort even if the gradient changes to a certain extent. As an index of this change, a "contrast sensitivity value" has been conventionally employed, and the difference in the gradient value at a level that human beings cannot perceive can be represented as "256 gradients÷contrast sensitivity value". As shown in FIG. 7 (b), from the fact that the resolution of a cellular phone LCD is approximately 170 dpi, and is usually used at a position approximately 30 cm away from human eye, a viewing angle of 7 degrees and 120 cycles; that is a spatial frequency of 17 (cycles/degree), can be obtained. Therefore, the contrast sensitivity value is approximately 20 from the graph shown in FIG. 7(a), and the difference in gradients that human beings cannot distinguish is 12.8. When the deviation of the position of the coordinate value represented by 256×256 is 1, the deviation of the gradient value represented by 40×40 is 40. Thus the permissible position deviation of the coordinate value represented by 256×256 (="approximation threshold") can be calculated as 12.8÷40=0.32.

FIG. 8 is an example of a table indicating the correspondence between pattern numbers and pattern Bezier curves. In the pattern Bezier curves, as described above, 32 patterns are defined by fixing x-coordinates of control points of the two positions ¼ and ¾ along a line connecting the start point $(x_1, y_1)$ and the end point $(x_4, y_4)$, and varying y-coordinates from −16 to 15, the pattern number is assigned corresponding to the pattern. The Bezier curves are represented as in the equation 3 described later.

Figure 9:
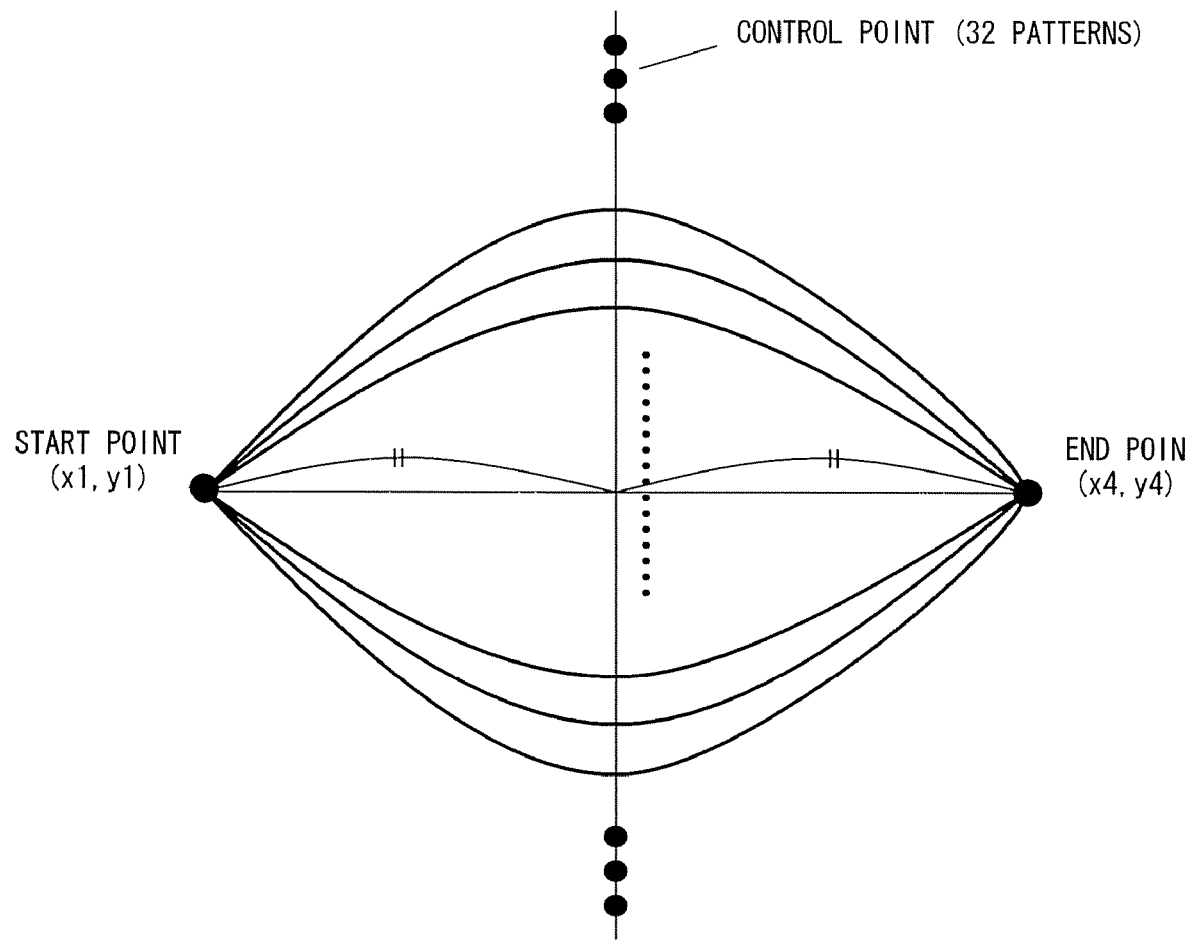
FIG. 9 is a diagram showing an example of a case that assumes an approximate curve pattern to be a spline curve.

FIG. 9 is a diagram showing an example of a case that assumes a spline curve as an approximate curve pattern. As shown in FIG. 9, in the spline curve approximation, the x-coordinate of a control point is at a position ½ way along a line connecting the start point $(x_1, y_1)$ and the end point $(x_4, y_4)$, and a y-coordinate has 32 patterns defined from −16 to 15. The 32 defined patterns correspond to the pattern numbers and are stored in a table (not shown in the drawing) for use.

Figure 10A:
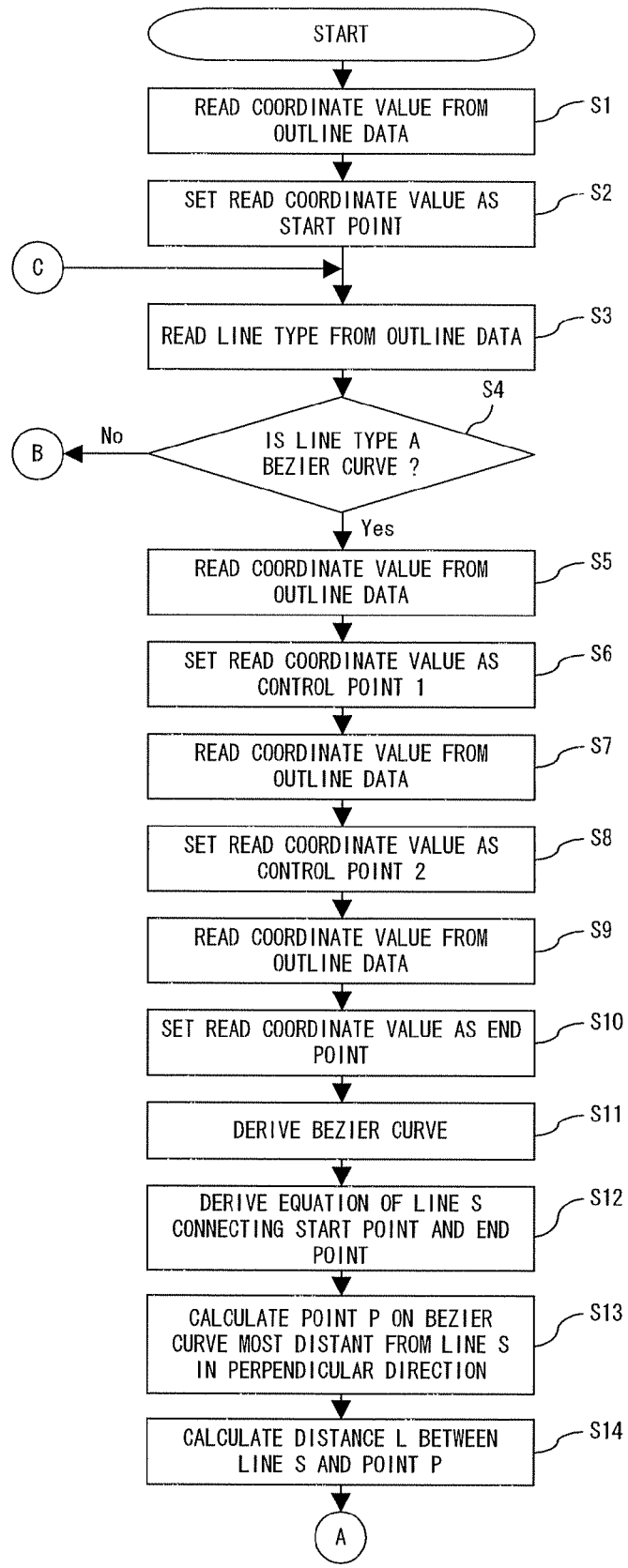
FIG. 10A is a flowchart explaining a conversion processing operation relating to the embodiment of the present invention.
Figure 10B:
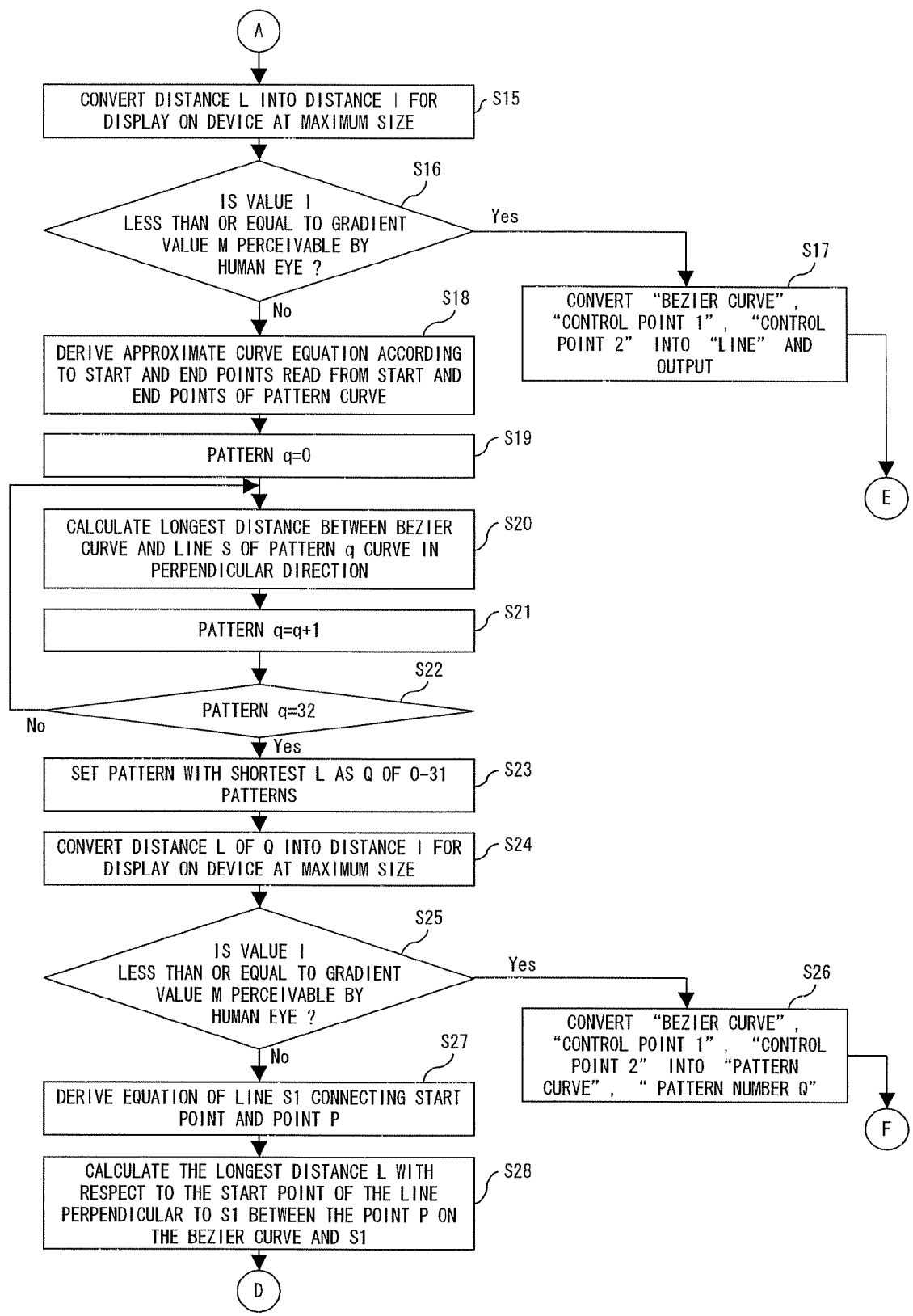
FIG. 10B is a flowchart explaining a conversion processing operation relating to the embodiment of the present invention.

FIG. 10A through FIG. 10C are flowcharts explaining the conversion processing operations relating to the embodiment of the present invention. The conversion processing operations, based on the flowcharts of FIG. 10A through FIG. 10C, start from reading the coordinate value (X, Y) from the top of the outline data in step S1. In step S2, the coordinate value read in step S1 is set as the start point $(x_1, y_1)$. Next, in step S3, the line type is read out from the outline data. In step S4, if the line type read in step S3 is a Bezier curve, processing proceeds to step S5; otherwise the processing proceeds to step S36 after reading the coordinates of the termination point from the outline data.

In step S5, the coordinate value (X, Y) is read out from the outline data. In step S6, the coordinate value read in step S5 is set as a control point 1 $(x_2, y_2)$ of the Bezier curve. In step S7, the coordinate value (X, Y) is read out from the outline data. In step S8, the coordinate value read in step S7 is set as a control point 2 $(x_3, y_3)$ of the Bezier curve. In step S9, the coordinate value (X, Y) is read out from the outline data. In step S10, the coordinate value read in step S9 is set as the end point $(x_4, y_4)$ of the Bezier curve.

In step S11, a Bezier curve of the equation (1) is derived from the four points of the start point, the control point 1, the control point 2 and the end point.

[Equation 1] (1)

$$\left.\begin{array}{l} x = (1-t)^3 x_1 + 3(1-t)^2 t x_2 + 3(1-t)t^2 x_3 + t^3 x_4 \\ y = (1-t)^3 y_1 + 3(1-t)^2 t y_2 + 3(1-t)t^2 y_3 + t^3 y_4 \\ (0 \leq t \leq 1) \end{array}\right\}$$

In step S12, an equation (2) of a line S connecting the start point and the end point of the Bezier curve is derived.

[Equation 2] (2)

$$\left.\begin{array}{l} x = (1-s)x_1 + s x_4 \\ y = (1-s)y_1 + s y_4 \\ (0 \leq s \leq 1) \end{array}\right\}$$

In step S13, a point P located on the Bezier curve where the line S and the Bezier curve are the most distant in a direction perpendicular to the line S is calculated from the equations (1) and (2). In step S14, the distance L between the line S and the point P is calculated from the coordinate value of the point P obtained in step S13. In step S15, the distance L is converted into a distance l, which is a distance drawn on the display device at a maximum size. In step S16, when the distance l (=gradient difference value l) is a value M, which is a limit of the gradient difference perceivable by human eye, or less the processing proceeds to step S17; otherwise it proceeds to S18. In step S17, the Bezier curve is approximated by the line S, the original out line data in which the line type "Bezier curve" the coordinate values "control point 1" and "control point 2", can be changed to the line type "line". The processing proceeds to step S33 after the output of the data.

In step S17, the Bezier curve is approximated by the line S, the original outline data in which the line type is "Bezier curve" the coordinate values "control point 1" and "control point 2", can be changed to the line type "line". The processing proceeds to step S33 after the output of the data. In step S18, in the case of approximation of the Bezier curve by the pattern curve, the start point $(x_1, y_1)$ and the end point $(x_4, y_4)$ of the equation (3) are used, and in the case of approximation by the spline curve the equation (4) is derived.

[Equation 3] (4)

$$\left.\begin{array}{l} x = (1-s)^3 x_1 + 3(1-s)^2 s x_2(q) + 3(1-s)s^2 x_3(q) + s^3 x_4 \\ y = (1-s)^3 y_1 + 3(1-s)^2 s y_2(q) + 3(1-s)s^2 y_3(q) + s^3 y_4 \\ (0 \leq s \leq, 0 \leq q \leq 31) \end{array}\right\}$$

In the above equation (3), x-coordinates of control points are set to the two positions of ¼ and ¾ along a line connecting the start point $(x_1, y_1)$ and the end point $(x_4, y_4)$, and q is a pattern number; regarded as a y-coordinate from −16 to 15, by obtaining each pattern Bezier curve corresponding to the number, the table shown in FIG. 8 can be acquired.

[Equation 4] (4)

$$x = (1-s)^2 x_1 + 2s(1-s)x_2(q) + s^2 x_4$$
$$y = (1-s)^2 y_1 + 2s(1-s)y_2(q) + s^2 y_4$$
$$(0 \leq s \leq 1, 0 \leq q \leq 31)$$

In step S19, 0 is substituted for the pattern number q. In step S20, the distance L in a case that the Bezier curve and an approximation curve are the most distant in the perpendicular direction with respect to the line S is calculated from the equation (3) and the equation (1) of the Bezier curve corresponding to the pattern number q. In step S21, the value of the pattern number q is incremented by 1. In step S22, when the value of the pattern number q is 32, the processing proceeds to step S23, otherwise proceeds to step S20. In step S23, the pattern number of the L that has the smallest value in the loop of step S19 through S22 is set to Q. In step S24, the distance L of the pattern Q is converted into a distance l at a maximum size drawn on the display device. In step S25, when the distance l (=gradient difference value l) is a value M, which is a limit of the gradient difference perceivable by human eye, or less the processing proceeds to step S26, otherwise proceeds to S27.

In step S26, the Bezier is approximated by a pattern approximation line, the original outline data in which the line type is "Bezier curve" the coordinate values "control point 1" and "control point 2", can be replaced by the line type "pattern curve" and "pattern number Q" and the processing proceeds to step S37 after the output of the data. In step S27, an equation (5) of a line $S_1$, for connecting the start point $(x_1, y_1)$ and the point P $(x_p, y_p)$ is derived.

[Equation 5] (5)

$$x = (1-s)x_1 + sx_p$$
$$y = (1-s)y_1 + sy_p$$
$$(0 \leq s \leq 1)$$

In step S28, in the perpendicular direction with respect to the line $S_1$, the distance $L_1$, between the Bezier curve and the line $S_1$, both of which connect the start point $(x_1, y_1)$ and the end point $(x_p, y_p)$, are the most distant from each other is calculated from the equation (1) and the equation (5). In step S29, the distance $L_1$ obtained in step S28 is converted into the distance $l_1$ at a maximum size drawn on the display device. In step S30, when the distance $l_1$ (=gradient difference value $l_1$) is a value M, which is a limit of the gradient difference perceivable by human eye, or less the processing proceeds to step S31, otherwise proceeds to S36.

In step S31, an equation (6) of a line $S_2$ connecting the point P $(x_p, y_p)$ and the end point $(x_4, y_4)$ is derived.

[Equation 6] (6)

$$x = (1-s)x_p + sx_4$$
$$y = (1-s)y_p + sy_4$$
$$(0 \leq s \leq 1)$$

In step S32, the distance $L_2$ between the Bezier curve and the line $S_2$, both of which connect the point $(x_p, y_p)$ and the end point $(x_4, y_4)$, in the perpendicular direction to the line $S_2$ where they are most distant from each other is calculated from the equation (1) and the equation (6). In step S33, the distance $L_2$ obtained in step S32 is converted into the distance $l_2$ at a maximum size drawn on the display device. In step S34, when the distance $l_2$ (=gradient difference value $l_2$) is a value M, which is a limit of the gradient difference perceivable by human eye, or less the processing proceeds to step S35, otherwise proceeds to S36.

In step S35, the Bezier curve is approximated by two lines, the original outline data in which the line type is "Bezier curve" the coordinate values "control point 1" and "control point 2", can be changed to the line type "line", coordinate value "point P $(x_p, y_p)$" and the line type "line" and the processing proceeds to step S37 after the output of the data. In step S36, conversion processing of the Bezier curve does not occur, and the original data is output. In step S37, the coordinate value $(x_4, y_4)$ of the end point is assigned as the start point $(x_1, y_1)$ of the next line. In step S38, the processing is terminated if drawing of the outline is finished and a closed curve is completed, otherwise the process returns to step S3.

It is possible to compress the entire outline font file by applying the above flow to every character. In the above flow, an example of performing approximation processing using the first through the third approximation processes relating to the present invention is described; however, it is possible to modify the example to perform one or more of the approximation processing from the first through the third approximation processes relating to the present invention based on the above flow.

After performing the processing, by collecting frequency of appearance statistics of every coordinate value and the types of lines connecting the coordinates, the existing entropy compression processing such as Huffman coding is performed.

Based on the overview of the above explanation, the present invention comprises the following configuration:

(1) An outline font compression method comprising any one or more of: a first approximation process for approximating the data with a distance between a curve and a line of a value L or less by a line among data representing a Bezier curve comprised in outline data, when the outline data of the character designed to an accuracy of a size X square is present, and a size of the character to be displayed on a screen is a size Y (Y<X) or less, a second approximation process for approximating a Bezier curve, where a distance between a curve and a line is L or more in the first approximation process, and the distance is L' (L'>L) or less, by two lines, and/or a third approximation process for, when the degree of curvature of the Bezier curve is close to a predefined curve pattern, approximating the Bezier curve by the pattern.

(2) The outline font compression method according to (1), wherein, the first approximation process converts Bezier curve data into a line data connecting the start point and the end point of a Bezier curve, based on a premise that when a character designed to an accuracy of a size X square is displayed on a screen of the size Y square, the character outline is represented by an anti-aliasing method, if a difference between the gradient value of an outline pixel when a character is represented at the size Y square and when a part of the character outline is drawn as a Bezier curve as per the original outline data and the gradient value of an outline pixel when an outline is drawn as a line connecting a start point and an end point of a Bezier curve is the same as or less than the difference in gradients, which is not distinguishable by the human eye.

(3) The outline font compression method according to (1) wherein, the second approximation process converts Bezier curve data into a line data connecting the start point and the end point of a Bezier curve, based on a premise that when a character designed to an accuracy of a size of X square is displayed on a screen of the size Y square, the character outline is represented by an anti-aliasing method, if a difference between the gradient value of an outline pixel when a character is represented at the size Y square and the gradient value of an outline pixel when a part of the character outline is drawn as a Bezier curve as per the original outline data, where a point of a line connecting the start point and the end point of a Bezier curve is the most distant from the Bezier curve is assigned as A, when an outline is drawn as two lines of a line connecting the start point of the Bezier curve to A and a line connecting A to the end point of the Bezier curve, is the same as or less than the difference in gradients, which is not distinguishable by the human eye.

(4) The outline font compression method according to (1) wherein, the third approximation process converts Bezier curve data into a pattern number corresponding to a pattern curve and maintains a table for defining a Bezier curve in which a normal line of a point where a line connecting the start point and the end point of the Bezier curve is the most distant from the Bezier curve runs through the midpoint of the line, and the curvature of the normal line has N patterns, and for corresponding the Bezier curve to a pattern number in advance, based on a premise that when a character designed to an accuracy of a size X square is displayed on a screen of the size Y square, the character outline is represented by an anti-aliasing method, if a difference between the gradient value of an outline pixel when a character is represented at the size Y square and when a part of the character outline is drawn as a Bezier curve as per the original outline data and the gradient value of the outline pixel when the outline is drawn by one of N pattern curves defined in the table is the same as or less than the difference in gradients, which is not distinguishable by the human eye.

(5) The outline font compression method according to (1), for converting a part of a Bezier line into a line or a curve using any of the first through the third approximation processes and later compressing by collectively performing entropy coding of the converted start point, end point and control point of the Bezier curve.

(6) The outline font compression method according to any of (2) through (4), for approximating by any applicable one of the first through the third approximation processes under the condition that when the difference between the gradient value of the outline pixel before approximation and the gradient value of the outline pixel after approximation is converted into a distance to an accuracy of the size X square which is the maximum difference in gradients that cannot be distinguished by the human eye, a distance between the Bezier curve and approximated line does not exceed the distance.

(7) The outline font compression method according to (4) wherein, in the third approximation method, a predefined curve is a spline curve of N patterns of curvature, with a control point located on a perpendicular line passing through the midpoint of a line, which connects the start point and the end point of the line.

According to the present invention explained above, effective usage of the above three approximation processes allow representation of a Bezier curve by a small data volume, in particular, drastic data reduction is possible for a font with a design comprising many curves, and thus it is effective for a display device implemented in an embedded device.

What is claimed is:

1. An outline font compression method, comprising any one or more of:
    a first approximation process for approximating data representing a Bezier curve comprised in outline data by a line if a distance between a curve and a line is a value L or less;
    a second approximation process for approximating a Bezier curve, where a distance between a curve and a line is L or more in the first approximation process, and the distance is L' (L'>L) or less, by two lines; and/or
    a third approximation process for, when a degree of curvature of the Bezier curve is close to a predefined curve pattern, approximating the Bezier curve by the pattern,
    when outline data of a character designed to an accuracy of a size X square is present, and a size of the character to be displayed on a screen is a size Y (Y<X) or less,
    wherein the outline data is read from a first outline data storage and approximated data of the Bezier curve is stored in a second outline data storage and wherein the first approximation process, the second approximation process, and the third approximation process are performed by an approximation line converter unit.

2. The outline font compression method according to claim 1, wherein the first approximation process,
    based on a premise that the character outline is represented by an anti-aliasing method when a character designed to an accuracy of a size X square is displayed on a screen of the size Y square,
    converts a Bezier curve data into a line data connecting the start point and the end point of a Bezier curve
    if a difference between the gradient value of an outline pixel when a character is represented in the size Y square and when a part of the character outline is drawn as a Bezier curve as per the original outline data, and the gradient value of an outline pixel when an outline is drawn as a line connecting a start point and an end point of a Bezier curve is the same as or less than the difference in gradients, which is not perceivable by the human eye.

3. The outline font compression method according to claim 1 wherein, the second approximation process,
    based on a premise that when a character designed to an accuracy of a size X square is displayed on a screen in the size Y square, the character outline is represented by an anti-aliasing method,
    converts a Bezier curve data into a line data connecting the start point and the end point of a Bezier curve
    if a difference between the gradient value of an outline pixel when a character is represented at the size Y square and when a part of the character outline is drawn as a Bezier curve as per the original outline data, and the gradient value of an outline pixel when a point of a line connecting the start point and end point of the Bezier curve is the most distant from the Bezier curve is assigned as an A, and when an outline is drawn as two lines of a line connecting the start point of the Bezier curve to the A and a line connecting the A to the end point of the Bezier curve, is the same as or less than the difference in gradients, which is not perceivable by the human eye.

4. The outline font compression method according to claim 1 wherein, the third approximation process, maintaining a table for defining a Bezier curve in which a normal line of a point on a line connecting the start point and the end point of the Bezier curve is the most distant from the Bezier curve passes through the midpoint of the line, and the curvature of the Bezier curve has N patterns, and for a correspondence of the Bezier curve to a pattern number prepared in advance, and based on a premise that when a character designed to an accuracy of a size X square is displayed on a screen of the size Y square, the character outline is represented by an anti-aliasing method, converts Bezier curve data into a pattern number corresponding to a pattern curve if a difference between the gradient value of an outline pixel when a character is represented at the size Y square and when a part of the character outline is drawn as a Bezier curve as per the original outline data, and the gradient value of the outline pixel when the outline is drawn as one of N pattern curves defined in the table is the same as or less than the difference in gradients, which is not perceivable by the human eye.

5. The outline font compression method according to claim 1, for converting a part of a Bezier line into a line or a curve using any of the first through the third approximation processes and later compressing by collectively performing entropy coding of the converted start point, end point and control point of the Bezier curve.

6. The outline font compression method according to any of claims 2 through 4, for approximating by any applicable one of the first through the third approximation processes under the condition that when the difference between the gradient value of the outline pixel before approximation and the gradient value of the outline pixel after approximation is converted into a distance to an accuracy of the size X square which is the maximum difference in gradients that cannot be perceived by the human eye, a distance between the Bezier curve and the approximated line does not exceed the converted distance.

7. The outline font compression method according to claim 4 wherein, in the third approximation method, the predefined curve is a spline curve of N patterns of curvature, with a control point located on a perpendicular line passing through the midpoint of a line connecting the start point and the end point thereof.

* * * * *

UNITED STATES PATENT AND TRADEMARK OFFICE
CERTIFICATE OF CORRECTION

PATENT NO. : 7,676,104 B2 Page 1 of 1
APPLICATION NO. : 11/275609
DATED : March 9, 2010
INVENTOR(S) : Kohei Terazono It is certified that error appears in the above-identified patent and that said Letters Patent is hereby corrected as shown below:

First Page, Column 2 (Foreign Patent Documents), Line 9, change "10-222145" to --10-222146--.

Signed and Sealed this

First Day of June, 2010

David J. Kappos
*Director of the United States Patent and Trademark Office*